United States Patent [19]
Siegel et al.

[11] Patent Number: 5,565,672
[45] Date of Patent: Oct. 15, 1996

[54] OPTICAL TRANSIMPEDANCE RECEIVER WITH COMPENSATION NETWORK

[75] Inventors: Stefan A. Siegel, Upper Macungie Township; Michael L. Snodgrass, Allentown, both of Pa.

[73] Assignee: Lucent Technologies Inc., Murray Hill, N.J.

[21] Appl. No.: 366,513

[22] Filed: Dec. 30, 1994

[51] Int. Cl.⁶ .................................................. H04B 9/00
[52] U.S. Cl. ............................... 250/214 R; 250/214 A; 330/59
[58] Field of Search ................... 250/214 R, 214 A, 250/214 C; 330/59, 291; 359/161, 189

[56] References Cited

U.S. PATENT DOCUMENTS

| | | | |
|---|---|---|---|
| 4,620,321 | 10/1986 | Chown | 250/214 A |
| 4,623,786 | 11/1986 | Rodwell | 250/214 A |
| 4,759,081 | 7/1988 | Witters | 330/59 |
| 5,202,553 | 4/1993 | Geller | 250/214 A |
| 5,286,969 | 2/1994 | Roberts | 250/214 A |
| 5,329,115 | 7/1994 | Lim | 250/214 R |

OTHER PUBLICATIONS

Stewart E. Miller and Ivan P. Kaminow "Optical Fiber Telecommunications II" Academic Press Inc., 1988 pp. 689–722.

*Primary Examiner*—Stephone Allen

[57] ABSTRACT

An apparatus and method is provided that improves the dynamic range of an optical transimpedance receiver. The receiver includes a photodetector, a transimpedance front end amplifier and a non-liner feedback. The non-linear feedback means consists of a Schottky diode and shunting the transimpedance resistor with a parasitic capacitor. A lead compensation network is further included in the feedback circuitry to provide stability to the non-linear circuit by advancing the phase shifting of the transimpedance front end by 45 degrees. By stabilizing the frequency off the circuit, the dynamic range is increased from 26.6 dB to 40 dB.

12 Claims, 4 Drawing Sheets

OPTICAL TRANSIMPEDANCE RECEIVER WITH COMPENSATION NETWORK

BACKGROUND OF THE INVENTION

1. Field of the Invention

This invention relates generally to optical receivers and more particularly to optical transimpedance receivers with compensation networks in a non-linear feedback loop.

2. Description of the Related Art

An optical receiver typically includes a photodetector and a low noise preamplifier as a front end, and an equalizer, post amplifier and filter as a linear channel. This arrangement converts a modulated optical signal into an electrical signal. Further processing of the signal can then be done to recover whatever information had been impressed on an optical carder. The front end of the receiver often consists of a photodiode as the photodetector and a transimpedance amplifier as the preamplifier. This forms a transimpedance front end where a load resistor is replaced by a large feedback resistor, and negative feedback around a wideband amplifier is used to obtain increased bandwidth.

The capacitive input impedance of the low noise preamplifier causes a phase shift of 90 degrees at high frequency, and the inverting amplifier contributes a phase shift of 180 degrees. Optimally, a phase margin of about 45 degrees needs to be maintained. This allows for a maximum additional open-loop phase shift of only 45 degrees up to the frequency at which the open-loop gain becomes less than unity. This small, tolerable phase shift limits the gain that can be included within the feedback loop and it is usually not possible to obtain the desired preamplifier bandwidth if a large feedback resistor is used. Limiting the size of this feedback resistor will lower the sensitivity but, in exchange, will have greater simplicity and much wider dynamic range. In order to maintain the sensitivity of the signal, transimpedance front ends normally give up some of the dynamic range. One prior art method of overcoming this loss of range was by forward-biasing the gate-source diode of the front-end transimpedance amplifier to shunt the feedback resistor. This is described in "PIN-GaAs FET Optical Receiver With a Wide Dynamic Range" by B. Owen, *Electronic Letters* Vol. 18 No. 4, July 1982, pages 626, 627. Although this reduces the loss of the dynamic range, peaking will occur when the diode is switched on, causing instability in this non-linear circuit.

SUMMARY OF THE INVENTION

In accordance with the principles of the invention, a non-linear element is employed in a feedback loop of an optical transimpedance receiver. A compensation network is added to the feedback loop to eliminate peaking and improve stability of the non-linear element. The feedback loop acts to increase the dynamic range of the optical receiver.

BRIEF DESCRIPTION OF THE DRAWINGS

So that one skilled in the art to which the subject invention appertains will better understand how to practice the present invention, preferred embodiments of the apparatus and method will be discussed in detail hereinbelow with reference to the drawings wherein:

FIG. 5C is a graph illustrating the transfer function of the present invention when the Schottky diode turns on.

DETAILED DESCRIPTION OF THE PREFERRED EMBODIMENTS

Figure 1:
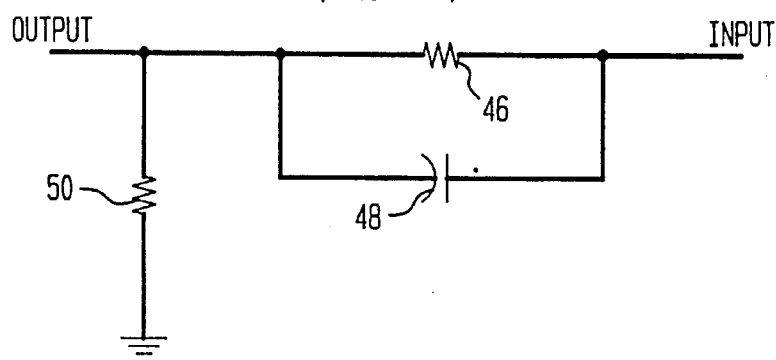
FIG. 1 is a prior art circuit diagram of a simple lead compensation network.
Figure 1A:
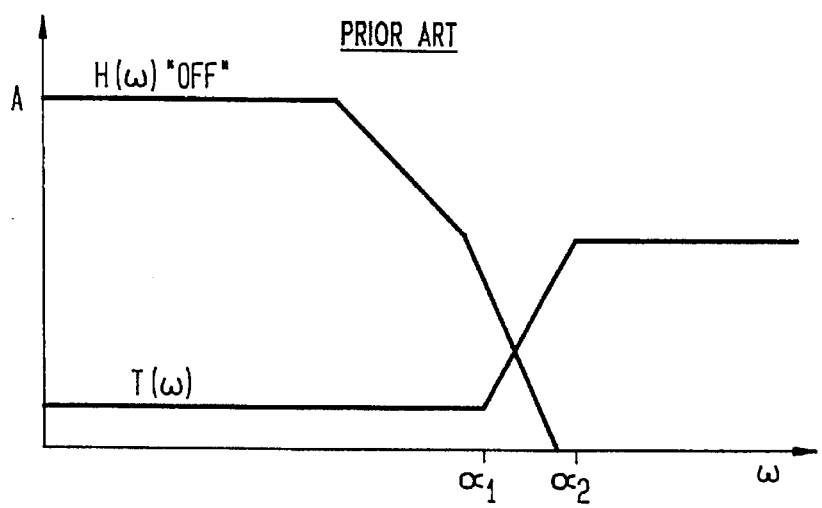
FIG. 1A is a graph representing the transfer function of the lead compensation network as shown in FIG. 1.

FIG. 1 illustrates a prior art lead compensation network used to stabilize feedback amplifiers. Resistor 46 is $R_1$, resistor 50 is $R_2$ and capacitor 48 is designated simply as C. The transfer function at zero is $1/R_1C$, equaling $\alpha_1$, whereas at the pole the function is $1/(R_1\|R_2)C$ equaling $\alpha_2$. This lead network will introduce a low-frequency attenuation. FIG. 1A shows the general characteristics of the lead network labeled $T(\omega)$. The network provides attenuation for $\omega<\alpha_1$ and gain for $\omega>\alpha_2$. In addition, them is a 45 degree phase shift at the midpoint frequency between $\alpha_1$ and $\alpha_2$. In the preferred embodiment, this happens when $R_1=1.5$ k, $R_2=2$ k and $C=2_{pF}$.

Figure 2:
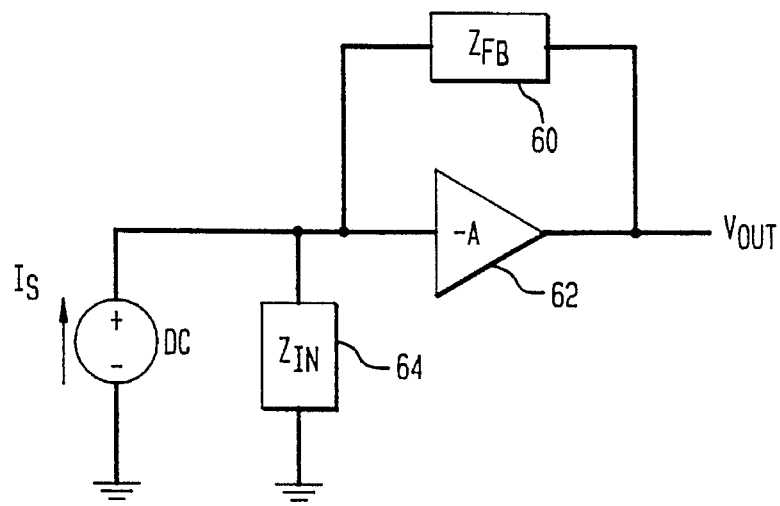
FIG. 2 is a prior art block diagram of a basic transimpedance amplifier.

The block diagram of the basic transimpedance amplifier is shown in FIG. 2. Using the schematic of FIG. 4, the input impedance 64 is depicted as $Z_{IN}$ and consists of resistor 46 in parallel with capacitor 48. The feedback impedance 60 is depicted as $Z_{FB}$ and consists of feedback resistor 44 in parallel with parasitic capacitor 42. Thus in the basic case, the amplifier has two poles; one set by the input capacitance and the other set by feedback parasitics. Since the amplifier inverts the input signal, the open loop gain "A" is indicated with a negative sign. The transfer function for the amplifier can be written as:

$$\frac{V_O}{I_S} = \frac{Z_{FB}}{1+(Z_{FB}\cdot Z_{IN}/A)}$$

Figure 3:
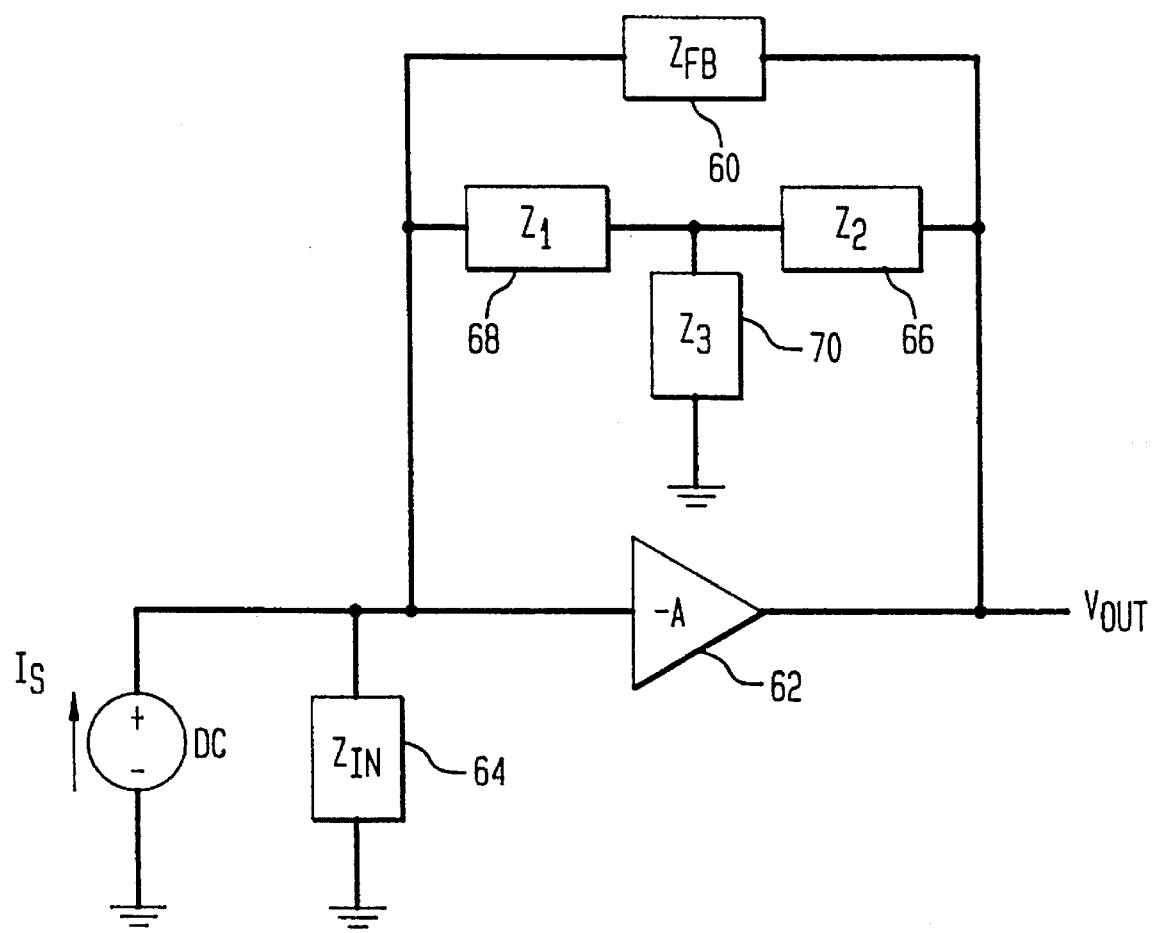
FIG. 3 is a block diagram of a general Bridged-Tee feedback network as is the present invention.

The block diagram of FIG. 3 shows a transimpedance amplifier employing a "Bridged-Tee" feedback network, of which the lead compensation network is further described as part of the present invention. The effective impedance of the added "Tee" section 66, 68, 70 (depicted as $Z_1$, $Z_2$, and $Z_3$) is:

$$Z_{TEE} = Z_1 \cdot \left[ 1 + Z_2\left(\frac{1}{Z_1} + \frac{1}{Z_3}\right)\right]$$

The effective impedance of the feedback loop with this impedance now becomes:

$$Z_{BR} = \frac{1}{\left(\dfrac{1}{Z_{FB}} + \dfrac{1}{Z_{TEE}}\right)}$$

Thus, the transfer function of the transimpedance amplifier with this network is:

$$\frac{V_O}{I_S} = \frac{1}{\left[\frac{1}{Z_{BR}} + \left(\frac{1}{A}\right)\left(\frac{1}{Z_{IN}} + \frac{1}{Z_{BR}} + \frac{Z_2}{Z_{TEE} \cdot Z_3}\right)\right]}$$

Figure 4:
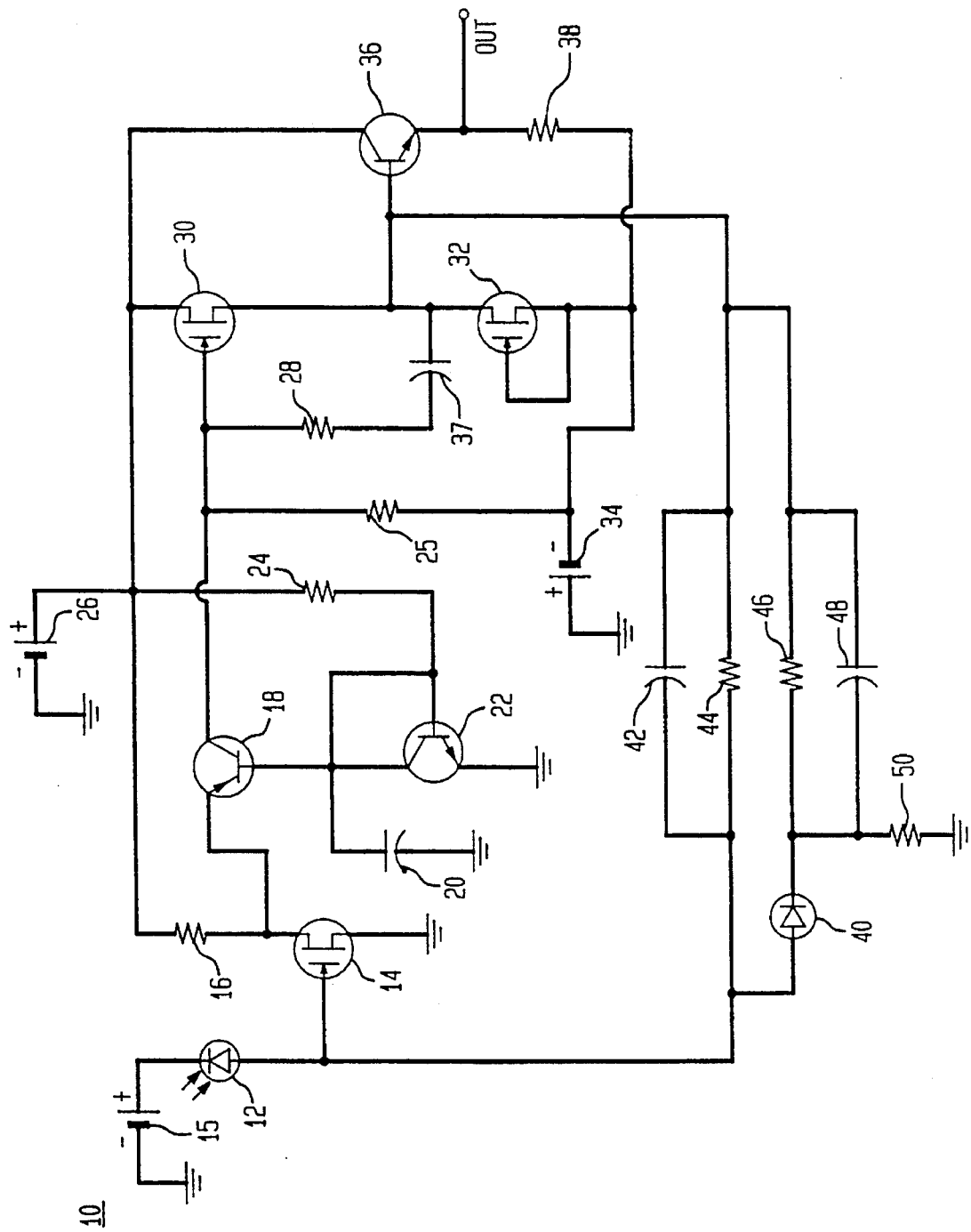
FIG. 4 illustrates the present invention of an optical transimpedance receiver with a lead compensation network.

In the lead compensation implementation of the present invention, $Z_1$ equals the forward resistance of the Schottky diode 40 shunted by the diode capacitance 42, $Z_2$ equals the parallel combination of resistor 46 and capacitor 48, and $Z_3$ equals resistor 50 as shown in FIG. 4. The transimpedance amplifier with a lead compensation network of this type has an extra pole and an extra zero over the basic transimpedance amplifier response. By choosing appropriate values for $Z_2$ and $Z_3$ as will be discussed herein, the extra zero can be used to cancel one pole in the transimpedance amplifier response and greatly stabilize the circuit.

The basic lead network of FIG. 1 is added to a transimpedance front end optical receiver network as shown in FIG. 4 generally at 10. An optical signal is incident on photodiode 12, having a voltage bias via voltage source 15, converting the light into an electrical signal. JFET 14 provides a signal gain of approximately 24, with resistor 16 being approximately 1.3 k ohms. With amplifiers of large gain, any small feedback capacitance can give rise to a large input capacitance. This input capacitance is commonly referred to as the Miller capacitance of the amplifier. Transistor 18 is in a common base configuration to reduce this Miller capacitance of the subsequent stages. Transistor 22, with capacitor 20 and resistor 24, form a current source to provide bias to transistor 18. The JFET pair 30 and 32 form a source follower when used in conjunction with resistors 25 and 28, and capacitor 37. This provides very high impedance and in addition, provides no voltage drop of the signal across JFET 30. Transistor 30 can then maximize the downward (negative) signal swing. Voltage source 26 is a positive voltage whereas voltage source 34 is negative.

Transistor 36, with resistor 38, form the output buffer for the signal. The transimpedance resistor 44 of 100 k ohms provides the basic feedback for small signal levels and sets the bandwidth. The transimpedance resistor 44 is shunted by a parasitic capacitor 42 estimated to be about 50 fF.

The circuit thus far described is a transimpedance front end design for a wideband optical receiver. The present invention may include a silicon Schottky diode 40 as part of the feedback loop of the transimpedance amplifier. This diode turns on for high input signal levels and thus increases the bandwidth and reduces the net transimpedance avoiding saturation of the amplifier. The use of a separate Schottky diode 40 gates the feedback resistor 44 into the input of the transistor 14 with a very high switching rate and very low noise. The Schottky diode 40 begins to turn on when the product of the peak-to-peak input signal current and transimpedance resistor 44 equals the turn-on voltage of the Schottky diode 40 (about 10 microamps times 100 k ohms in the preferred embodiment). In order to ensure stabile circuit operation, the lead compensation network of FIG. 1 is added to the overall feedback circuit.

Figure 5A:
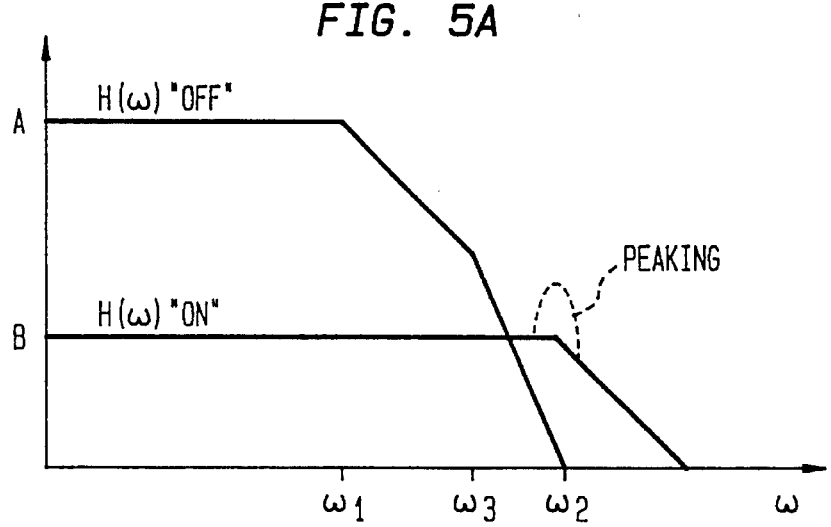
FIG. 5A is a graph of the transfer function of a transimpedance receiver with a Schottky diode added to the feedback loop.

FIG. 5A is a graphical representation of the transfer function of the uncompensated transimpedance amplifier. $H(\omega)$ "off" represents the transfer function is when the Schottky diode 40 is off and $H(\omega)$ "on" represents the function when the Schottky diode 40 is on. The response of the receiver amplification of the circuit rolls off at a 6 dB/octave rate as the frequency increases until the circuit parasifics induce a steeper rolloff after $\omega_3$. With sufficient optical power incident on the photodiode 12, the Schottky diode 40 turns on and the circuit gain is reduced while the bandwidth is increased to $\Omega_2$. However, the $H\omega$ "on" transfer function shows peaking due to the presence of the zero at $\omega_2$.

Figure 5B:
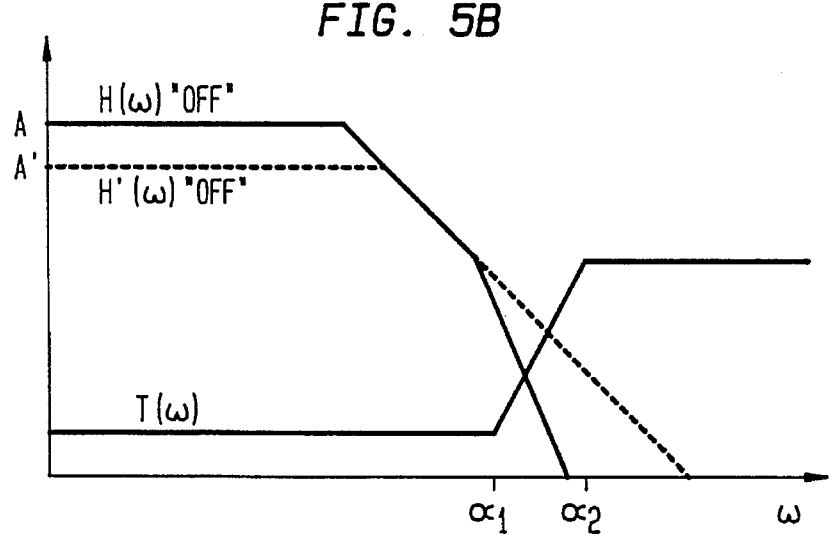
FIG. 5B is a graph illustrating the transfer function of the present invention with the Schottky diode off.

Now employing the compensation network $T(\omega)$ as described above, $H'(\omega)$, as shown in FIG. 5B, becomes the circuit's new transfer function. The rolloff is now at a constant 6 dB/octave over the entire frequency range, but the new circuit gain has been somewhat reduced from A to A'.

Figure 5C:
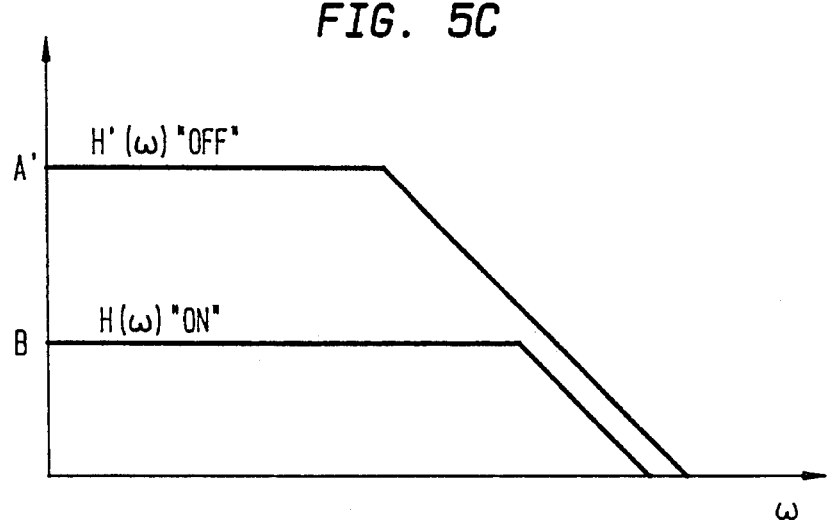

When the Schottky diode 40 turns on, the compensated circuit response is illustrated in FIG. 5C. Note that the peaking has now been eliminated.

Although it is relatively easy to set $\alpha_1$, $\alpha_2$ is a compromise since if resistor 50 and 46 are too small, the circuit response to high signal levels is reduced. Resistor 50 should be no smaller than 1 k ohms for maximum overload protection. In the preferred embodiment $\alpha_1$ is set to 50M Hz and $\alpha_2$ is set to approximately 90M Hz. The sensitivity is estimated to be about −49 dBm nominal and the maximum input signal amplitude is approximately −10 dBm or greater. This yields a dynamic range of near 40 dB whereas without the compensation network the range was only 26.6 dB.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. An optical receiver circuit for receiving optical signals comprising:

a photodetector for converting an optical signal to an electrical signal;

a transimpedance amplifier operatively connected to said photodetector;

non-linear feedback means for increasing optical dynamic range of said converted electrical signal; and a compensation network connected in series with said non-linear feedback means for improving stability of said converted electrical signal.

2. The receiver circuit of claim 1, wherein said photodetector is a photodiode.

3. The receiver circuit of claim 1, wherein said transimpedance amplifier causes a phase shift of 90 degrees.

4. The receiver circuit of claim 1, wherein said non-linear feedback means includes a Schottky diode.

5. The receiver circuit of claim 4 wherein said non-linear feedback means further includes a transimpedance receiver shunted by a parasitic capacitor.

6. The receiver circuit of claim 3, wherein said compensation network is a lead-type compensation network advancing said phase shift.

7. The receiver circuit of claim 6, wherein said lead-type compensation network advances said phase shift to 45 degrees.

8. A method of receiving and converting an optical signal, comprising the steps of:

detecting said optical signal via a photodetector;

translating said optical signal to an electrical signal;

amplifying said electrical signal through at least one amplification circuit creating an amplified electrical signal;

feeding a portion of said amplified electrical signal back into said at least one amplification circuit; and compensating said portion of said amplified electrical signal in series with said at least one amplification circuit, improving stability of said amplified electrical signal.

9. The method of claim 8 wherein said amplifying said electrical signal causes a phase shift.

10. The method of claim 8, wherein said feeding step further includes biasing a Schottky diode.

11. The method of claim 10, wherein said feeding step further includes shunting a parasitic capacitor across a transimpedance resistor.

12. The method of claim 9, wherein said compensating step further advances said phase shift 45 degrees.

* * * * *